US007672897B2

(12) United States Patent
Chung et al.

(10) Patent No.: US 7,672,897 B2
(45) Date of Patent: Mar. 2, 2010

(54) METHOD OF COMMUNITY PURCHASING THROUGH THE INTERNET

(76) Inventors: Scott Chung, 330 S. Barrington, #103, Los Angeles, CA (US) 90049; Ted Chung, 330 S. Barrington, #103, Los Angeles, CA (US) 90049; Richard Yoon, 18931 Kinbrace St., Northridge, CA (US) 91326

( * ) Notice: Subject to any disclaimer, the term of this patent is extended or adjusted under 35 U.S.C. 154(b) by 510 days.

(21) Appl. No.: 11/380,616

(22) Filed: Apr. 27, 2006

(65) Prior Publication Data
US 2006/0184384 A1    Aug. 17, 2006

Related U.S. Application Data

(63) Continuation-in-part of application No. 09/768,447, filed on Jan. 24, 2001, now abandoned.

(51) Int. Cl.
*G06Q 40/00* (2006.01)
(52) U.S. Cl. .......................... 705/37; 705/35
(58) Field of Classification Search .................... 705/35, 705/37
See application file for complete search history.

(56) References Cited

U.S. PATENT DOCUMENTS

| 6,704,713 | B1 * | 3/2004 | Brett ........................... 705/37 |
| 7,263,498 | B1 * | 8/2007 | Van Horn et al. ............. 705/26 |
| 2001/0049625 | A1 * | 12/2001 | Mowry ......................... 705/14 |
| 2001/0049648 | A1 * | 12/2001 | Naylor et al. ................. 705/37 |
| 2001/0052000 | A1 * | 12/2001 | Giacalone, Jr. .............. 709/218 |
| 2002/0010584 | A1 * | 1/2002 | Schultz et al. ............... 704/270 |
| 2002/0184128 | A1 * | 12/2002 | Holtsinger .................... 705/35 |
| 2004/0210514 | A1 * | 10/2004 | Kemp et al. ................... 705/37 |
| 2007/0083438 | A1 * | 4/2007 | Coleman ..................... 705/26 |

OTHER PUBLICATIONS

With a Little Help From VH1.com, Ring Out the Year Formerly Known as 1999 With the Artist Entertainment Editors. Business Wire. New York: Dec. 13, 1999. p. 1.*
You just can't beat the smell of success Madacy Entertainment has parlayed the ability to put a CD onto store shelves in less than a week into annual sales of $100-million; [National Edition] Kathryn Leger. National Post. Don Mills, Ont.: Apr. 14, 1999. p. C.10.*

* cited by examiner

*Primary Examiner*—Lalita M Hamilton
(74) *Attorney, Agent, or Firm*—Richard Yoon

(57) ABSTRACT

In accordance with the present invention, a method and system of communal purchasing is disclosed. The preferred embodiments describe a community purchase model where a product can be purchased a particular price only if enough buyers are willing to purchase at that price. The preferred embodiments pool together the collective buys for a product to get a better price than if an individual buyer was to purchase the product by himself/herself. Therefore, a fixed "discount" price is used to collect a number of buys, wherein the number of buys is recorded in a specific product record and the transaction to purchase the product is consummated if the number of buys for the product reaches a minimum number of buys. Moreover, further embodiments obtain a pre-payment or a guarantee for payment for the product while collecting buys for the product. In addition, further embodiments set a cutoff date by when the number of buys must reach the number of minimum number of buys or cancel the product purchase if the cutoff date has been reached and the number of buys for the product associated with the product record does not reach the minimum number of buys.

20 Claims, 14 Drawing Sheets

FIG. 3

Record 71a, b, ... or n

| Record ID | Username | Password | E-mail Address | Name and Address | Credit Card Info | Current Orders | Purchase/ Preference Info | Shipping Info | Customization Options |
|---|---|---|---|---|---|---|---|---|---|
| 110 | 112 | 114 | 116 | 118 | 120 | 122 | 124 | 126 | 128 |

Record 76a, b, .... or n

| Record ID | Title of Art | Artist Name | Price Info | Genre | # of bids needed | # of bids received | Purchaser Record | Cut off Date | Stock Info |
|---|---|---|---|---|---|---|---|---|---|
| 210 | 212 | 214 | 216 | 218 | 220 | 222 | 224 | 226 | 228 |

FIG. 11

Record 71a', b' ... or n'

| 1110 | 1112 | 1114 | 1116 | 1118 | 1120 | 1122 | 1124 | 1126 | 1128 |
|------|------|------|------|------|------|------|------|------|------|
| Record ID | Username | Password | E-mail Address | Name and Address | Credit Card Info | Current Orders | Purchase/ Preference Info | Shipping Info | Customization Options |

Record 76a', b', .... or n'

| 1210 | 212 | 214 | 216 | 218 | 220 | 222 | 224 | 226 | 228 |
|------|-----|-----|-----|-----|-----|-----|-----|-----|-----|
| Record ID | Title | Mfg Name | Price Info | Dept code | # of buys needed | # of buys received | Purchaser Record | Cut off Date | Stock Info |

METHOD OF COMMUNITY PURCHASING THROUGH THE INTERNET

RELATED APPLICATIONS

This application is a continuation-in-part of U.S. patent application Ser. No. 09/768,447, filed on Jan. 24, 2001 now abandoned, titled Method of Producing and Selling Popular Works of Art Through the Internet, which is herein incorporated by reference.

BACKGROUND OF THE INVENTION

1. Field of the Invention

The method and apparatus of the present invention relate to buying and selling products using electronic networks such as the Internet. In particular, the present invention relates to a novel purchasing model using the Internet.

2. Description of the Related Art

The standard system of selling and buying requires sellers to sell goods or services based upon projected demand. However, buying on projected demand can be risky and costly to sellers if their projected demand differs from true demand. If sellers overspend on their inventory, the burden of excess supply and price fluctuations can be a huge problem for the seller. These are real world problems that are compounded if the inventory is purchased with credit. On the other hand, if sellers under-spend on inventory, profits on potential sales and ability to get discounts based on larger volume of purchases will be lost.

Similarly, the buyers have limited purchasing powers in the current traditional model of commerce. Buyers are often limited to only purchasing what goods and services that are offered to them by sellers. Moreover, buyers have limited voice in getting better prices from sellers. Since individuals have low purchase volume, they often must pay higher price per good or service set by the sellers. There are always transaction costs when dealing with sellers that are passed on directly to the buyers. Retail outlets such as Costco$^{SM}$ have allowed consumers to get better pricing per unit by offering larger quantities of the item, but buyers are often forced to buy in large quantities.

The use of the Internet has helped buyers get better pricing due to the increase in competition. Certain auction sites such as eBay$^{SM}$, has helped fuel a new market of buyers and sellers, where buyers can participate more in the price setting. However, inventory issues and overall buyer empowerment can still be improved since eBay$^{SM}$ is based on buyers competing against one another to raise the price on a limited number of items available for sale.

An example where the present invention can be applied is in the buying and selling of popular arts. Popular works of art such as music, books, software, etc. have been distributed primarily through traditional "brick and mortar" retail outlets. Over the past few years, a variety of retailers have set up websites allowing the purchase of such popular works of art via the Internet, and have given consumers confidence in purchasing products on-line. However, the Internet has yet to provide a better means for the artists to take advantage of the Internet revolution. In fact, although transaction costs have decreased for retailers selling over the Internet, the artists have not benefited. The reason being is that artists still rely on traditional recording labels, publishers, or other establishments to produce their works of art and sell it to their consumers. For example, in the music industry, even in the Internet era, the record labels still organize the promotion and marketing from the top down using traditional methods that are costly and increasingly ineffective. These costs are passed on to artists, (who subsidize, through their own record royalties, a costly, labor-intensive, and non-interactive marketing and promotion infrastructure) and consumers (who pay higher prices without receiving any increase in perceived value). There is a growing dissatisfaction in the artist community with this business model.

Recently, some artists have tried directly producing and selling their products to the consumer by means of the Internet. For example, the artist formerly known as Prince sold his album without the use a recording label by directly selling his album off of his website. However, other artists have been slow to follow his lead. Most artists do not desire to take all the risk without any guarantee of receiving any money. Moreover, most artists lack the sophistication to market and successfully sell their products using the Internet. Given the hurdles of trying to sell their own album off the Internet versus the security of traditional recording contracts, artists have not been able to tap into the Internet revolution. The present invention hopes to overcome the current deficiencies in the prior means of doing business. The present invention based on a new community purchasing model hopes to be able to provide artists an alternative method of distributing music and creating revenue which, thus far, has not existed. This new method of distribution can be more profitable for artist, and more tailored made for the consumers, resulting in an economic model that may change the way popular works of art are produced and sold.

SUMMARY OF THE PREFERRED EMBODIMENTS

The preferred embodiments provide a method and system for communal purchasing of a product at a fixed price over a network based on popular demand from a minimum number of buys from users. The preferred embodiments collect buys for a product wherein the number of buys are recorded in a specific product record and the purchase transaction is consummated if the number of buys for the product reaches a preset minimum number of buys. Moreover, further embodiments obtain a pre-payment or a guarantee for payment for the product with each buy. In addition, further embodiments set a cutoff date by when the number of buys must reach the number of minimum number of buys or cancels the purchase transaction if the cutoff date has been reached and the number of buys for the product associated with the product record does not reach the minimum number of buys.

The preferred embodiments allow the seller/manufacturer/service provider to sell a product based on existing demand. Advantages of the preferred embodiments include improved efficiency between the seller and the consumer, lower overhead costs in producing and marketing the product, and guaranteed money for seller and overall price benefits to the users.

BRIEF DESCRIPTION OF THE DRAWINGS

Referring now to the drawings in which like reference numbers represent corresponding parts throughout:

FIG. 3 illustrates files in a user record and a project record in accordance with preferred embodiments of the present invention;

FIG. 11 illustrates files in a user record and a product record in accordance with further preferred embodiments of the present invention;

DETAILED DESCRIPTION OF THE PREFERRED EMBODIMENTS

The preferred embodiments are directed to a method, system and program for consumers to order works of art directly from the artist. The preferred embodiments pools together users that are fans of a particular artist, and creates an immediate demand for the artist to produce another work of art (i.e. album, book, etc.). This is done by the users committing money upfront to "coproduce" the work of art and in return being the first to receive the work of art as well as receiving co-producer recognition. Thus, the preferred embodiments creates a community of users and artists where users incentivize artists to produce a work of art by guaranteeing a certain amount of money, facilitating greater efficiency, cost savings, and potentially more profits for the artists than traditional methods of production.

Still in other further preferred embodiments, the present invention can be applied to numerous other fields in addition to works of art. The preferred embodiment can be applied to pool together any group of purchasers to empower purchasing power for any particular service or good. In addition, the present invention allows the sellers to avoid inventory problems such as overstocking or under-stocking inventory by seeing "true" demand.

In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
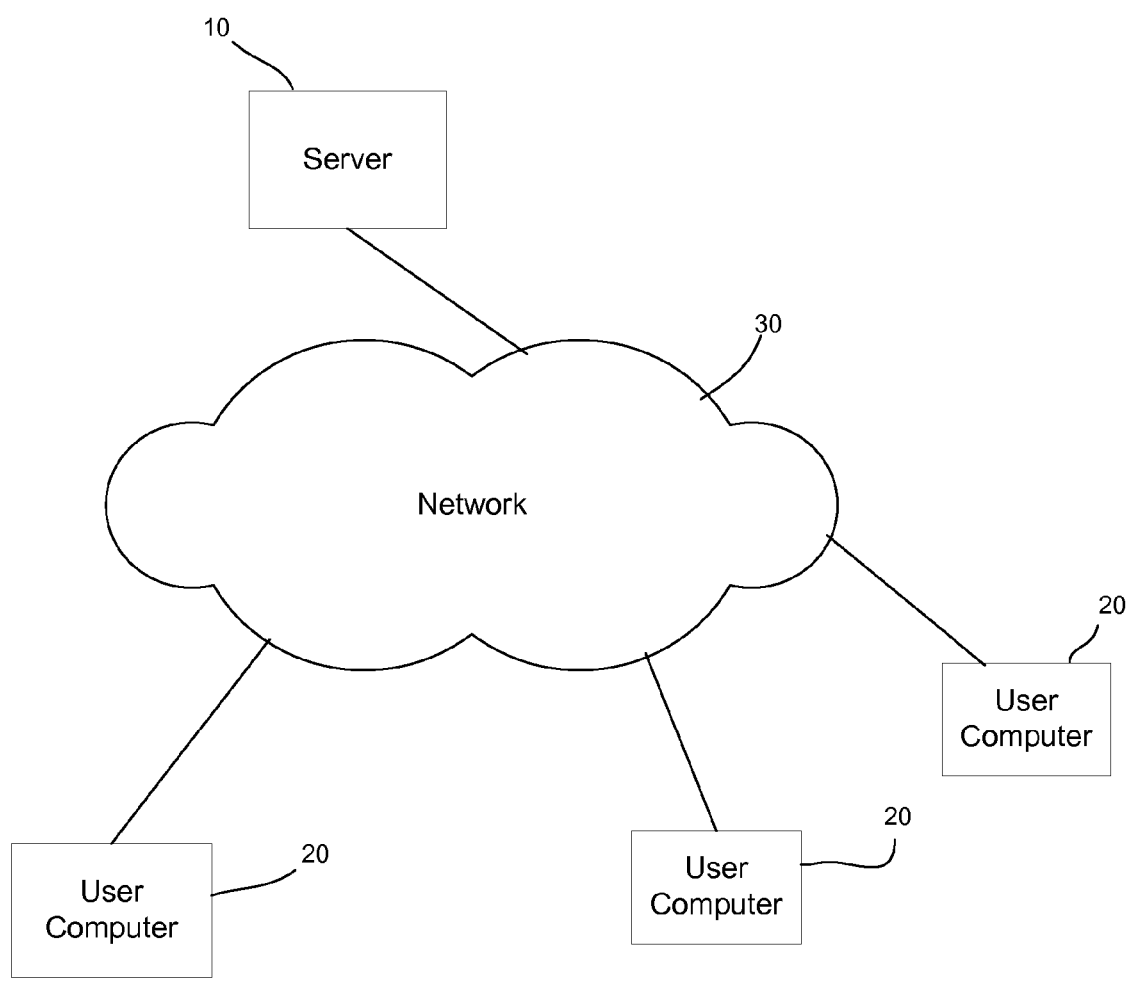
FIG. 1 illustrates a network computing environment in which preferred embodiments are implemented.

FIG. 1 is a schematic overview diagram of the network computing environment in which the preferred embodiments are implemented. In preferred embodiments, a server 10 and user computers 20 are linked together using a network 30, such as the Internet. The network 30 may be comprised of any network system known in the art including TCP/IP based networks (e.g., an Intranet, the Internet), LAN, Ethernet, WAN, Token Ring, etc. Alternatively, there may be separate and different networks between the components. Further, because the preferred embodiment of the network 30 is the Internet, there can be numerous users using the network 30 simultaneously, however only three user computers 20 are shown for illustration purposes.

Figure 2:
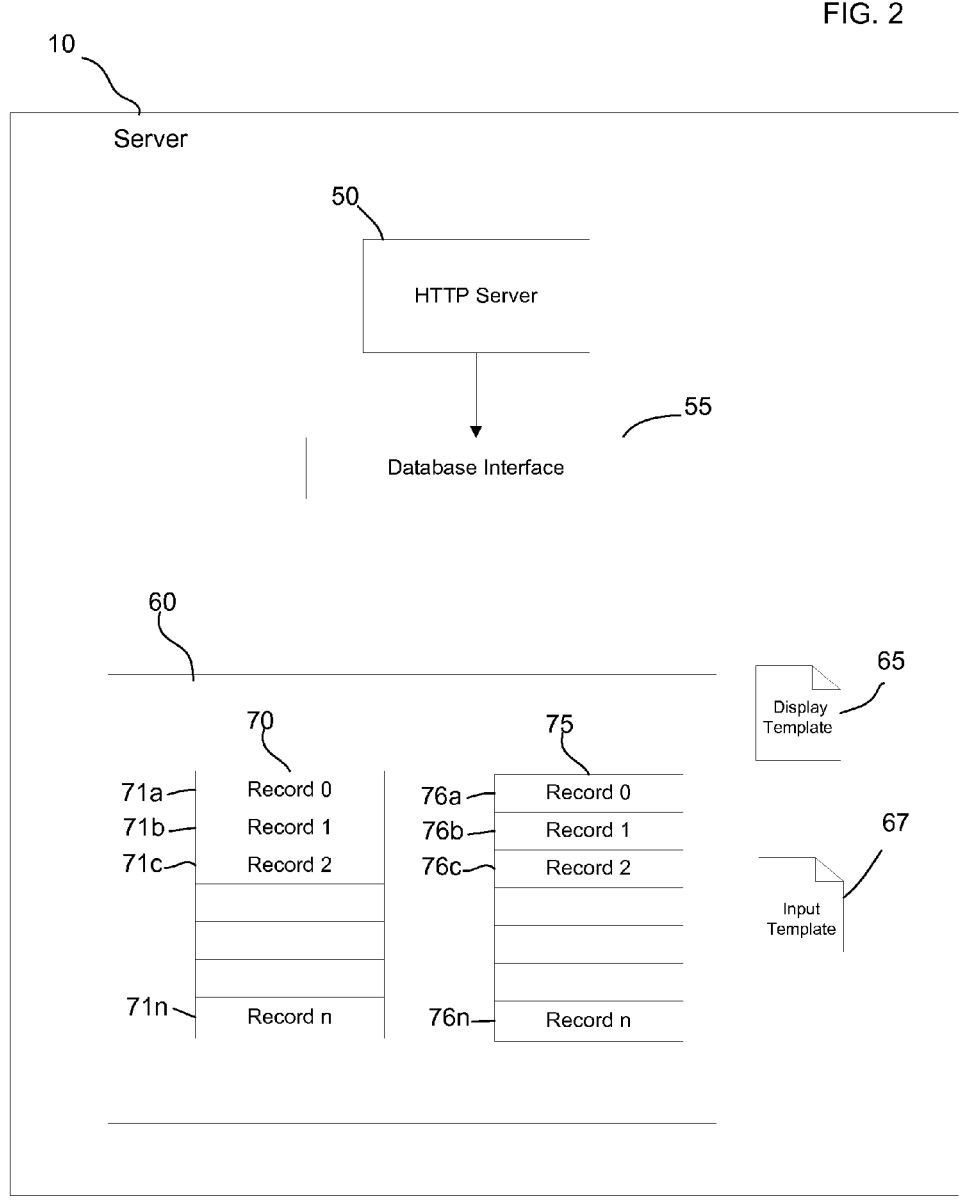
FIG. 2 illustrates a computing environment of a server in accordance with preferred embodiments of the present invention.

FIG. 2 illustrates software components in the preferred embodiment of server 10, including a Hypertext Transfer Protocol (HTTP) server 50, database 60, database interface 55 and templates 65 and 67. The HTTP server 50 responds to requests from the user computers 20 using HTTP client programs, such as web browser programs known in the art. Upon accessing the server 50 through the network 30 using a unique network address, such as an IP address, the database interface 55 will give specific access to database 60 depending on the secured identification provided by the user computers (i.e. unique username and password.)

The database 60 keeps current, accurate information about the users and the various works of art in the production process. The database 60 comprises a database program known in the art, such as a relational database program. In the preferred embodiment, the database 60 includes two database tables, user database table 70 and project database table 75. (Database tables 70' and 75' will be described with respect to further preferred embodiments of the invention according to FIGS. 10-13, but will have the same structural shape as database tables 70 and 75). User database table 70 includes user records 71a, b, . . . n which is used in the preferred embodiment to track user information. Project database table 75 includes project records 76a, b, . . . n which is used in the preferred embodiment to track works of art that are available to be produced.

The database interface 55 may comprise a Common Gateway Interface (CGI) program, a Java servlet, or other web page implementation known in the art to present the information in database 60 in a presentable format (e.g. HTML page, etc.). In preferred embodiments, the database interface 55 uses a secured login/password verification for identifying the individual user contacting the HTTP server 50. The assigning of a secured login/password will be explained in greated detail below. The unique identification will allow the database interface 55 to identify which user record 71a, b, . . . n belong to the requesting party and will appropriately give read/write capabilities to the user record 71a, b, . . . n.

The server 10 further stores a display template 65 and an input template 67, which are preferably implemented in a document in which dynamic content may be generated (i.e. HTML, Extended Markup Language (XML) Document, etc.). Differing variations of the display template 65 and input template 67 exists for both user information and info on the various works of art, depending on the information to be displayed or inputted, but a single display template 65 and a single input template 67 are used for illustration purposes in FIG. 2. The display template 65 is used to provide the user computers 20 with specific user information from the database table 70 or information on works of art from the database table 75. The database interface 70 generates data into the display template 65 from one or more of the records 71a, b, . . . n and 76a, b, . . . n in the database 60. The input template 67 includes fields in which the user may enter information to update the user record 76a, b, . . . or n, as well as update the project record 76a, b, . . . n when a purchase is made by the user.

The database 60, display template 65, and input template 67 are preferably stored in a non-volatile storage system, such as one or more hard disk drives, used by the server 10 for storage. The server 10 may load data from the storage system into volatile memory (not shown) when processing.

The server 10 and user computers 20 may comprise any type of computer device known in the art, including server, personal computer, mainframe, workstation, hand held device, etc. Moreover, the server 10 may comprise one or more separate computer systems to run the different program components 50, 55, and 60.

FIG. 3 provides an implementation of the fields in the user records 71a, b, . . . n of the preferred embodiments, which include:

Record ID 110: Provides a unique identifier generated by the database interface 55 for the each unique user.

Username 112: Provides a unique username created by the user that the user uses to login into the member only parts of the URL address.

Password 114: Provides a secret password created by the user used in conjunction with the username in order to access user information and order works of art.

E-mail Address 116: Provides a e-mail address of user.

Address 118: Comprises one or more sub-fields address, telephone, and other contact information of the user.

Credit Card Information 120: Comprises one or more sub-fields indicating the card name, card number, expiration date, billing address, etc.

Current Orders 122: One or more sub-fields set by the database interface 55 indicating the works of art user has committed to produce.

Purchase/Preference Information 124: One or more sub-fields set by database interface 55 providing purchasing history about the user including preferred genre, artist, etc. and the interests and preferences listed by the user during the Full Registration Process or Bidding Process.

Shipping Information 126: Comprises one or more sub-fields recording the shipping information selected by the user including the tracking information on the delivery of the completed work of art to the user including method of shipment, carrier, date of shipment and estimated time of arrival ("ETA").

Customization Options 128: Comprises one or more sub-fields recording customization options selected by the user during the Delivery process.

FIG. 3 also provides an implementation of the fields in the project records 76a, b, . . . n of the preferred embodiments, which include:

Record ID 210: Provides a unique identifier generated by the database interface 55 for the each unique work of art.

Title of Art 212: Provides an identifier for title of the work of art.

Artist Name 214: Provides an identifier name of artist producing work of art.

Price Info 216: Provides cost per unit information about the work of art.

Genre 218: Provides the type of work (i.e. music, book, etc.) and category of genre (rap, rock, country, mystery, horror, etc.).

No. of Bids Needed 220: Provides the preset number of bids needed before the work of art is produced.

No. of Bids Received 222: Provides the number of orders by users to produce the work of art.

Purchaser Record 224: Provides a list of all users ordering the project.

Cutoff Date 226: Provides the preset date that the number of bids needed equals the number of bids received.

Stock Info 228: Comprises one or more sub-fields recording whether the project has been ordered to be produced by the artist, and if produced, the number of works of art in stock at the warehouse.

Those skilled in the art will appreciate that FIG. 3 is a preferred embodiment of the records 71a, b, . . . n, and 76a, b, . . . n but not as the only implementation. The database tables 70 and 75 can be structured in many alternative formats to accomplish the present invention.

Typically the production process starts when the a contract is made between the artist and the website owner to produce a work of art if a certain demand for the work of art is established by the users of the website. The website owner determines the number of bids and cost per unit of the work of art needed in order for the production to be profitable. The number of bids and cost per unit is determined based on the minimum amount of money the artist agrees to accept to produce the work of art. The cut off date for when the number of orders is required is then set based on the contract terms and/or market analysis. The database administrater then allows the creation of a separate record 76a, b, . . . or n for each work of art in the database 60. The data for the Record ID 210, Title of Art 212, Artist Name. 214, Price Info 216, Genre 218, No. of Bids Needed 222, and Cut off Date 226 is generated and stored in the appropriate work of art record 76a, b, . . . n.

Figure 4:
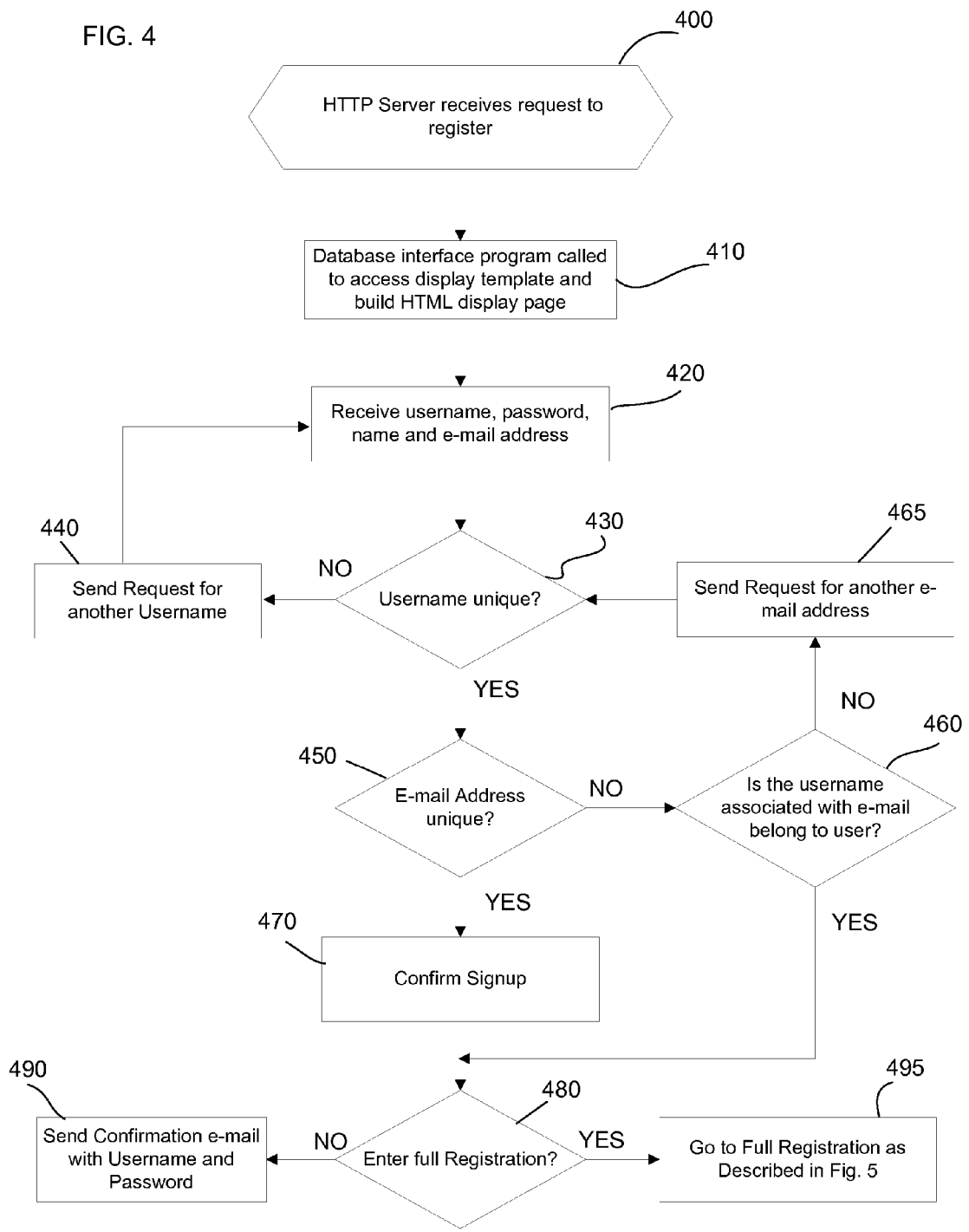
FIG. 4 illustrates a program flow implemented in the server to allow the user to register a Simple Registration.
Figure 5:
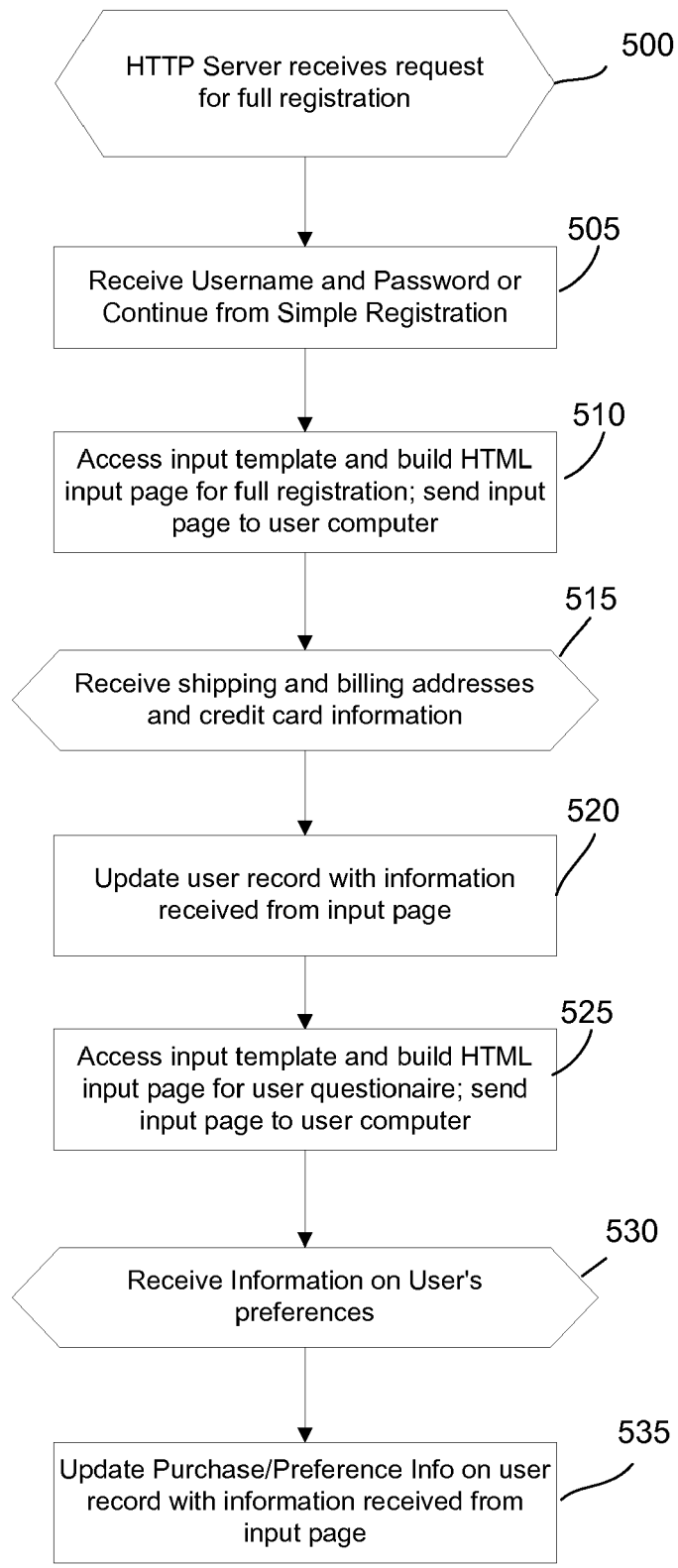
FIG. 5 illustrates a program flow implementation in the server to allow the user to register for a Full Registration.

FIGS. 4, 5, 6, 7, 8, and 9 illustrate the program logic embedded in the HTTP server 50 and the database interface 55 to implement the production process of the preferred embodiments. After one or more work of art records 76a, b, . . . n is created, the next step in the preferred embodiments is to create a community of users. FIG. 4 illustrates the program logic to establish a unique user record 71a, b, . . . n with basic user information ("Simple Registration"). At block 400, the HTTP server 50 receives a request from the user to register. At block 410, the database interface 55 accesses the input template 67 and builds an HTML web page quering the user to input username, password, name and e-mail address. The database interface program 55 then receives the inputted username, password, and e-mail (at block 420) and places the information in a new user record 71a, b, . . . n. The database interface 55 then checks the database table 70 to see if the username is unique (at block 430). If the username is already in use by another user record 70a, b . . . or n then at block 440, the database interface 55 accesses the input template 67 and builds an HTML web page requesting the user to input another username. The process is repeated until a unique username is assigned. At block 450, the e-mail address is checked to see if the e-mail entered is unique. If the e-mail address is already in use by another user record 70a, b . . . or n then at block 460, the database interface 55 accesses the input template 67 and builds an HTML web page stating that the e-mail address is associated with an existing username. The user is asked to confirm whether the username belongs to the user by asking for the password associated with the specific user record 71a, b, . . . or n. If the correct password is inputted, the prior user record is used and the new user record deleted. If not, at block 465, the user is queried to input another e-mail address. The process is repeated until a unique e-mail is assigned to the user record 71a, b, . . . or n. At block 470, an e-mail message is sent by the server 10 to confirm the signup by the user. Upon receiving confirmation via e-mail or hypertext link to the confirmation page (not shown), the user will be given an option to register for Full Registration which allows the user to actually bid/order a work of art. If no confirmation is received, the newly created user record will be deleted. At block 480, the database interface 55 will build a HTML web page based on a display template 65 which will list the benefits of full membership. The generated display page may include information such as Title of Art 212, Artist Name 214, and Genre 218 available in database 60. If the user decides not to signup for Full Registration, server 10 sends a confirmation e-mail to user using the E-mail Address 116 associated with the user record 71*a*, *b*, . . . or *n* . . . stating the Username 112 and Password 114 associated with the user record 71*a*, *b*, . . . or *n*. If the Full Registration option is selected, the logic of FIG. 5 is implemented from block 505.

FIG. 5 illustrates the program logic implemented in the HTTP server 50 and database interface 70 to enter additional information into the user record 71*a*, *b*, . . . *n* for Full Membership. In order to sign up of for Full Membership, a user must have already completed the simple registration process having a unique username and password. At block 500, once the user has logged in with his/her unique username and password, or after completing the simple registration, the user will be given the option for Full Membership. At block 505, the HTTP server 50 receives a request from the user for the input page to convert the user record 71*a*, *b*, . . . *n* from the Simple Registration to a Full Membership. In response, the HTTP server 50 requests (at block 510) the database interface 55, which accesses the input template 67 and builds an HTML input page for the specified user record 71*a*, *b*, . . . *n*. The built HTML input page is then sent to the user computer 20, where the user can enter the user's name, shipping address and credit card information, including the card name, card number, expiration date, and billing address associated with the credit card. At block 515, the HTTP server 50 receives the HTML input page with the address and credit card information the user entered. In response, the HTTP server 50 requests the database interface 55 to update (at block 520) the Name/Address field 118 and Credit Card Info field 120 of the relevant record with the information supplied by the user. In the preferred embodiment, the Full Membership process also includes collecting additional information from the user regarding the user's interest and preferences. By receiving the user's preferences in the type of music, books, or other interest, more relevant content can be directed towards the user. After receiving the preference information inputted by the user at block 530, the the HTTP server 50 requests the database interface 55 to update (at block 520) the preference information 126 of the relevant record with the information supplied by the user.

Figure 6:
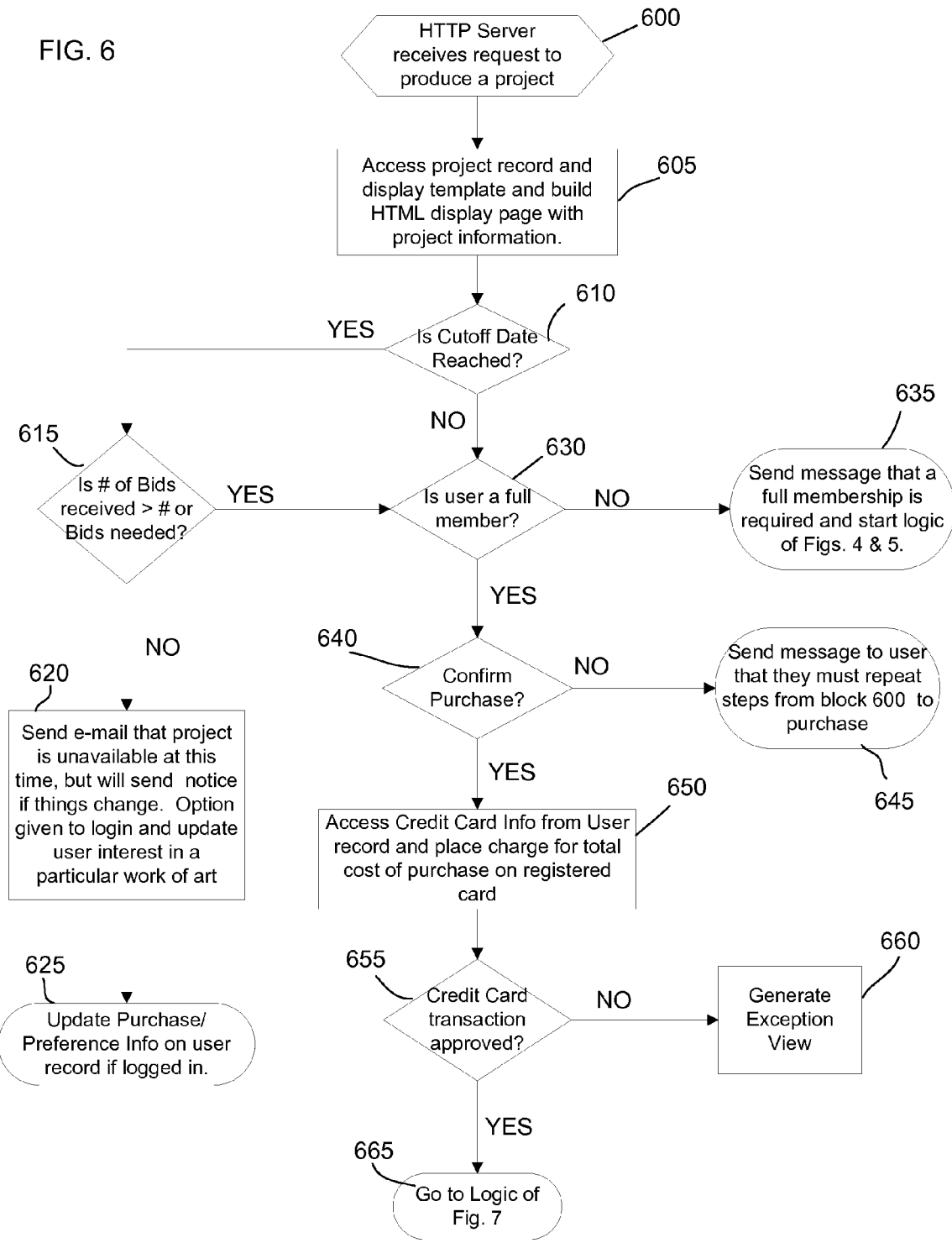
FIG. 6 illustrates a program flow implemented in the server for the payment process according to the preferred embodiments of the present invention.

In the preferred embodiments, a user who has signed up for Full Membership can participate in producing a work of art. FIG. 6 illustrates a program flow implemented in the server for the payment process according to the preferred embodiments of the present invention. At block 600, the HTTP server 50 receives a request to produce a work of art listed in the project database table 75. At block 605, the database interface 55 accesses the project record 76*a*, *b*, . . . or *n* for the selected project, and builds an HTML web page using the display template 65 with information recorded in the Artist Name 214, Title of Art 212, and Price Information 216 fields. At block 610, the database interface 55 determines whether the cutoff date has been reached by comparing the server's internal date clock with the date listed in the Cutoff Date field 226. If the cutoff date has been reached, the database interface 55 at block 615 determines whether the number of bids received is greater than the number of bids needed by comparing the two fields, Number of Bids Needed 220 and Number of Bids Received 222. If not enough bids were received for the project by the cutoff date, then at block 620, a notice is sent to the user that the project is unavailable at this time, but may be available again at some future date. An option is given to the user to update his record to keep informed of any changes in the future. A user must be logged in to allow the database interface 55 locate the user record 71*a*, *b*, . . . or *n* belonging to the user. Once the user record 71*a*, *b*, . . . or *n* is located by the user logging in, the database interface 55 updates the purchase/preference info field 124 of the user record 71*a*, *b*, . . . *n* to list the particular work of art requested.

If the cutoff date has not been reached or if the number of bids received is greater than the number of bids needed, the user is given the ability to coproduce the work of art. At block 630, the user is asked to login and the database interface 55 determines whether the user has already signed up for Full Membership. If the user has not previously signed up for Full Membership, the user is told that full membership is required and directed to sign up for Full Membership according to the logic of FIGS. 4 and 5 (at block 635). If the user has previously signed up for Full Membership, then the user is given the option to confirm the purchase quantity and identity of the work of art at block 640. If the user decides not to purchase, then a message is sent by the database interface 55 that the user must start the logic of FIG. 6 again to purchase the work of art, and the logic of FIG. 6 is terminated. If the user confirms the purchase, at block 650, the database interface 55 accesses Credit Card Info field 120 and places a charge for the total cost of the purchase. Alternatively, the database interface 55 can place a hold on the credit card for the entire amount of the purchase. At block 655, the database interface 55 waits until the credit card authorization is received. If the transaction is rejected, an exception view is generated at block 660 asking the user to input another credit card or to check with the user's credit card company. The user is given the opportunity to input new credit card information updating the user record, and retrying the credit card approval process. Once the credit card transaction is approved at block 665, the logic of FIG. 7 is started.

Figure 7:
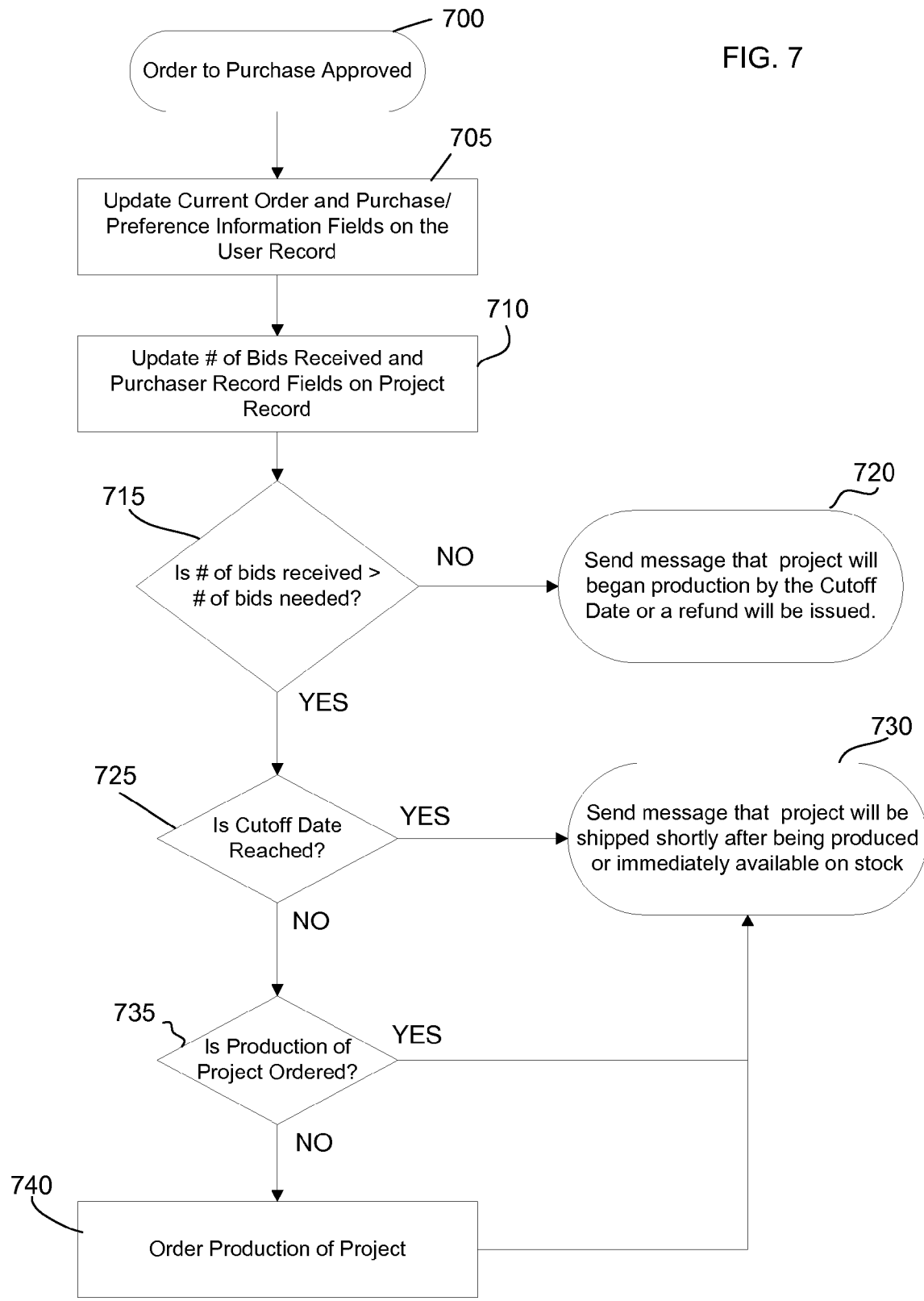
FIG. 7 illustrates a program flow implemented in the server to determine whether to produce the work of art project in accordance with preferred embodiments of the present invention.

FIG. 7 illustrates a program flow implemented in the server to determine whether sufficient demand to produce the work of art exists in accordance with preferred embodiments of the present invention. Once the order to purchase has been approved at block 700, the Current Order field 122 and Purchase/Preference Information 124 on the user record 71*a*, *b*, . . . or *n* is updated by the database interface 55. Thus, each decision to coproduce a work of art by the user is tracked in the unique user record 71*a*, *b*, . . . *n*. In addition, at block 710, the Number of Bids Received field 222 and the Purchaser Record field 224 on the project record 76*a*, *b*, . . . or *n* is updated by the database interface 55. The value of the Number of Bids Received is increased by the quantity of approved orders placed by the user, and the log of all the users who have placed an order for the work of art is kept track in the project record 76*a*, *b*, . . . or *n*. At block 715, the database interface 55 determines whether the number of bids received is greater than the number of bids needed by comparing the two fields Number of Bids Needed 220 and Number of Bids Received 222. If the number of bids received is less than the number of bids needed, then at block 720, a notice is sent to the user that the project will begin production by the date listed in the Cutoff Date field 226 or a refund will be automatically issued to the user credit card, and the logic of FIG. 7 is terminated. If the number of bids received exceeds the number of bids needed, the database interface 55 at block 725 determines whether the cutoff date has been reached by comparing the server's internal date clock with the date listed in the Cutoff Date field 226. If the cutoff date has been reached, then the database interface will know that the work of art has been already requested from the artist, and a message to the user is sent (at block 730) that the work of art will be shipped shortly after completion or if the work of art has already been produced that it will be shipped from existing inventory. On the other hand, if the cutoff date has not been reached, the database interface determines whether the work of art has been ordered from the artist by checking the Stock Info field 228 (at block 735). If the order to produce the work has not been issued already, the work is ordered at block 740 and the Stock Info field 228 of the project record 76*a, b, . . . n* is updated by the database interface 55 to reflect that the work of art has been ordered. However, regardless of whether the work of art has been previously ordered or not, the logic of FIG. 7 eventually terminates at block 730 since the number of bids received has exceeded the number of bids needed, triggering the artist obligation to produce the work of art based on the demand of the users. A message is sent to the user stating that the work of art will be shipped as soon as the work is completed and available for shipping.

Figure 8:
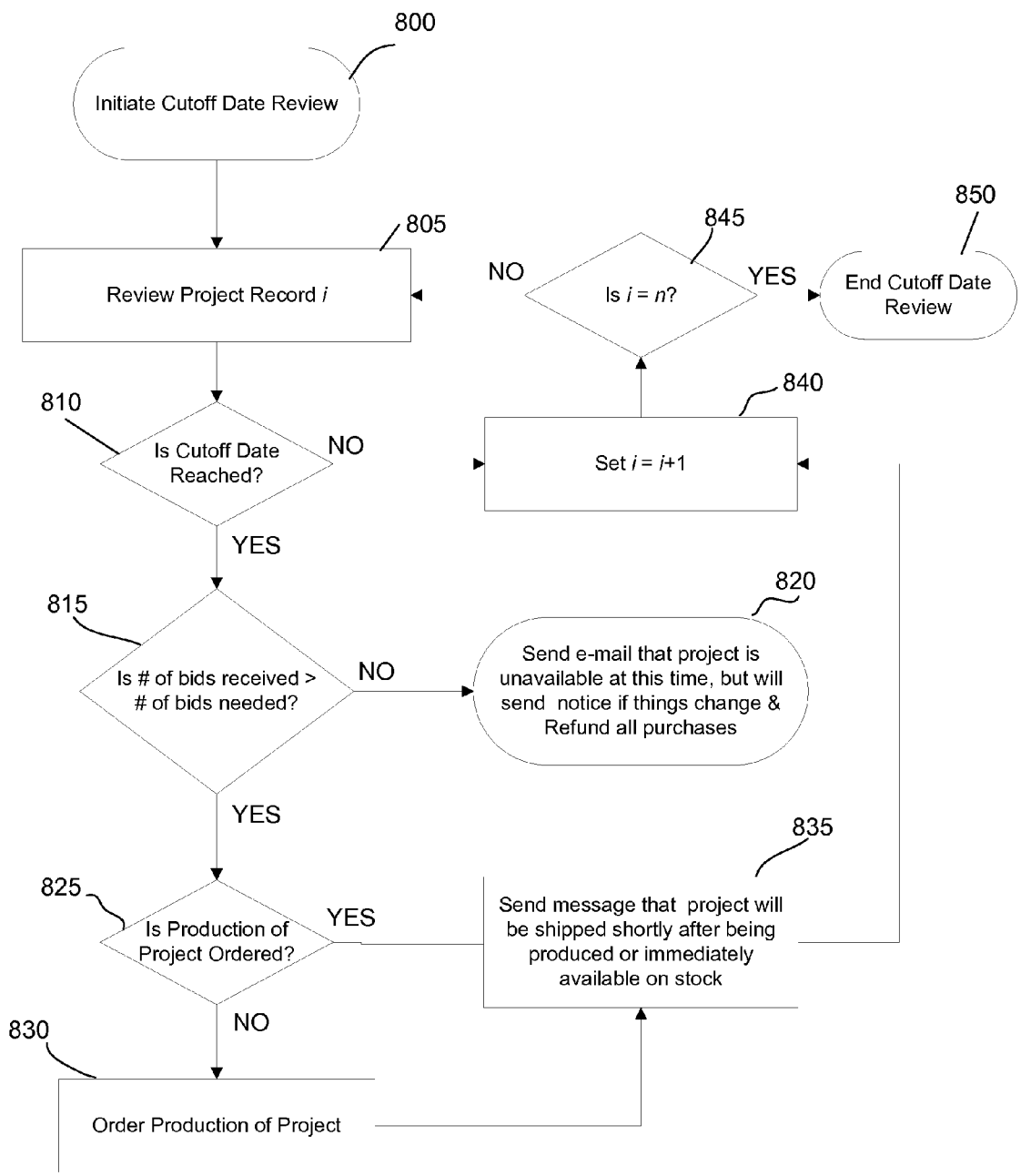
FIG. 8 illustrates an alternative program flow implemented in the server to determine whether to produce the work of art project in accordance with preferred embodiments of the present invention.

FIG. 8 illustrates an alternative program flow implemented in the server to determine whether to produce the work of art project in accordance with preferred embodiments of the present invention. At block 800, the database interface is scheduled to initiate a cutoff date review of the project records 76*a, b, . . . n* on a daily basis. The cutoff review begins by the database interface 55 checking the Cutoff Date field 226 on each individual project record 76*a, b, . . . n* (at block 805). Whether the cutoff date has been reached is determined by comparing the server's internal date clock with the date listed in the Cutoff Date field 226 (at block 810). If not, then database interface is set at block 840 to check the next project record. Before the next project record 76*a, b, . . . n* is reviewed, the database interface checks to see if all the project records have been checked already (at block 845). If all of the project records 76*a, b, . . . n* have been checked, the logic of FIG. 8 is terminated at block 850. Otherwise, the next project record 76*a, b, . . . n* is reviewed for its cutoff date. If the cutoff date has been reached for a particular project record 76*a, b, . . . n*, then the database interface 55 at block 815 determines whether the number of bids received is greater than the number of bids needed by comparing the two fields Number of Bids Needed 220 and Number of Bids Received 222. If not enough bids were received for the project by the cutoff date, then at block 820, a notice is sent to the user that the project is unavailable at this time, but may be available again at some future date. All orders for purchase are then refunded by crediting back the credit card for all users who have placed bids on the particular work of art as logged in the Purchaser Record field 224 of the project record 76*a, b, . . . n*. On the other hand, if the number of bids received exceeds the number of bids needed, the database interface determines whether the work of art has been ordered from the artist by checking the Stock Info field 228 (at block 825). If the order to produce the work has not been issued already, the work is ordered at block 830 and the Stock Info field 228 of the project record 76*a, b, . . . n* is updated by the database interface 55 to reflect that the work of art has been ordered. However, regardless of whether the work of art has been previously ordered or not, if the number of bids received has exceeded the number of bids needed, the artist obligation to produce the work of art based is triggered based on the demand of the users. A message is sent to the user stating that the work of art will be shipped as soon as the work is completed and available for shipping. The logic of FIG. 8 terminates at block 850 once all of the project records 76*a, b,* and *n* are checked that day.

Figure 9:
FIG. 9 illustrates a program flow implemented in the server to fulfill the Delivery Process in accordance with preferred embodiments of the present invention.

At some point, the work of art will be finished and ready for shipment. FIG. 9 illustrates a program flow implemented in the server to fulfill the Delivery Process in accordance with preferred embodiments of the present invention. Once the project is completed at block 900, the database interface 55 accesses the Purchaser Record field 224 (at block 905) to determine which users have ordered/coproduced the work of art. At block 910, the database interface 55 cross references the data in the Purchase Record field 224 to access the E-mail address field 116 of all the users listed. At block 915, an e-mail is sent to all the users in Purchase Record field 224 stating that the project is ready and to confirm that information in the Name and Address field 118, Shipping Information field 126 and Customization Options field 128 is up to date and correct. The Customization Options field 128 records the way the user prefers to have the his/her name listed on the work of art as a coproducer (e.g. Joe Smith, et al.). The default setting of the Customization Option field 128 will be the name listed in the Name and Address field 118, but the user is allowed to customize certain aspects of the credits on the work of art ordered by the user to change the name (e.g. "Babyface Joe"). In preferred embodiments, the choice of font and color will also be available in the Customization Option field 128. In addition, in preferred embodiments, the user will have the option to change the shipping option. For example, the default setting may be three day UPS ground shipping, but the user will have the option to pay for a faster priority shipping such Federal Express by agreeing to pay for the additional shipping option by means of the credit card listed in the Credit Card Information field 120.

After providing an opportunity for the users to confirm the shipping and customization information, the database interface 55 at block 925 produces an order to the fullfillment department of the company on how to deliver the work of art to the purchasers including shipping and customization requirements. Once the order to fulfill has been given, the Current Order field 122 and Shipping Information field 126 on the user record 71*a, b, . . .* or *n* is updated by the database interface 55 at block 930. Thus, the tracking of the delivery process is recorded in the unique user record 71*a, b, . . . n*. In addition, at block 935, the Stock Information field 228 on the project record 76*a, b, . . .* or *n* is updated by the database interface 55. Thus, the number of works of art being manufactured is kept track in the project record 76*a, b, . . .* or *n*.

Slight modifications can be made to the above detailed description related to works of art to make a generic community/collective purchase model that can be applied to a wide variety of consumer transactions. For example, the present invention can be applied to the world of electronic goods, automobiles, consumer disposables, travel services, etc. In ideal situations, the product will be from a manufacturer/service provider that already has a loyal consumer following. Thus, even the mere listing of the product will guarantee consumer demand. For example, consumers already seek out the latest Apple iPod™ music/video players from the first release based on the manufacturer's product reputation. Similarly, many product families have loyal followings. In further preferred embodiments of the present invention, the consumer purchasing model can work to provide such products to consumers at a better price point and allow manufacturer's to reduce the cost of selling their products. The business method contemplated by the above example is applicable to any situation where sellers would like to see a pre-established demand before delivering the product or service. A pre-established demand reduces uncertainty allowing better forecasts for manufacturing and projected revenue for budgeting and contract valuation purposes. In addition, the present business method provides advantages over auction systems where price is a constant unknown. Given the unknown outcome of auctions, a seller will always risk being obligated to sell below its desired/projected price. The consumer/collective purchasing model is also ideal for any situation that bulk purchase will result in a cheaper price point for all buyers. Given that a set price is based on having at least a certain number of users/buyers interested in the product, buyers are incentivized to get other buyers to purchase the product. So rather than competition between buyers, buyers work together to get the best price for all. Such a community purchase model creates a grassroots type marketing as buyers spread the word so that everyone can get a great price for a particular product. For shorthand purposes, the term "product" used anywhere in the drawings or the written description also encompasses services or any other project that can be performed using the described methodology. Similarly, the term "buy" can be used interchangeably with "bid" or "purchase." In addition, other terms such as "seller" or "manufacturer" or "service provider" and "communal" and "collective" can be used interchangeably throughout the written description.

Figure 10:
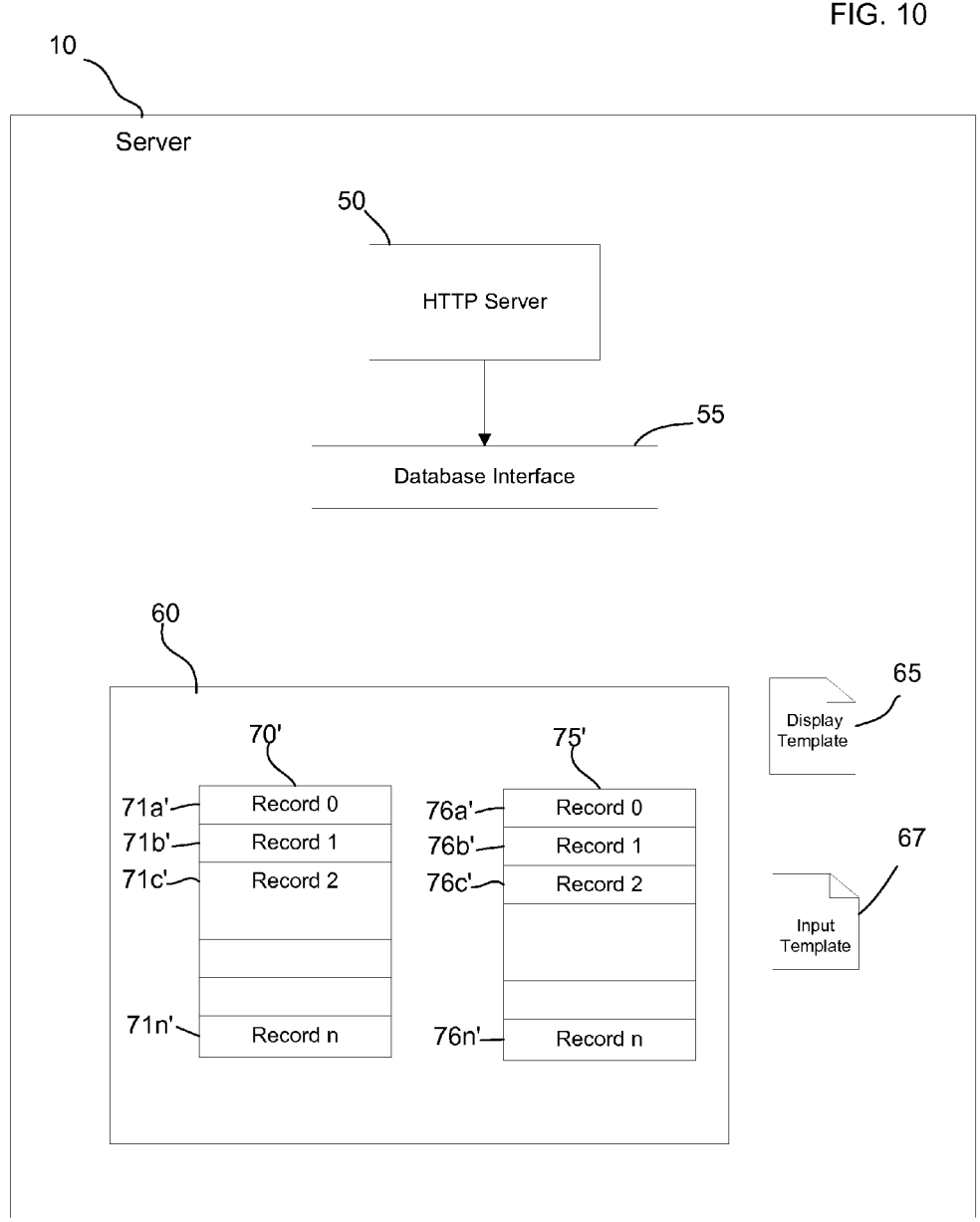
FIG. 10 illustrates a computing environment of a server in accordance with further preferred embodiments of the present invention.

FIGS. 10-13 show how modifications to the above description on works of art can be used to produce further preferred embodiments of the present invention related to a generic community purchase model. As described previously with respect to FIG. 2, the database 60 is not changed to work with the more generic community purchase model. Database 60 will still be used to keep current, accurate information about the users and the various products offered through the community purchase model. In the further preferred embodiment as seen in FIG. 10, the database 60 still uses two database tables, a user database table 70' and a product database table 75'. User database table 70' includes user records 71a', b', ... n' which is used in the preferred embodiment to track user information. Product database table 75' includes product records 76a', b', ... n' which is used in the preferred embodiment to particular products being offered to the users/sellers.

FIG. 11 provides an alternative implementation of the fields in the user records 71a', b', ... n' of the further preferred embodiments, which include:

Record ID 1110: Provides a unique identifier generated by the database interface 55 for the each unique user.

Username 1112: Provides a unique username created by the user that the user uses to login into the member only parts of the URL address.

Password 1114: Provides a secret password created by the user used in conjunction with the username in order to access user information and purchase product.

E-mail Address 1116: Provides an e-mail address of user.

Address 1118: Comprises one or more sub-fields address, telephone, and other contact information of the user.

Credit Card Information 1120: Comprises one or more sub-fields indicating the card name, card number, expiration date, billing address, etc.

Current Orders 1122: One or more sub-fields set by the database interface 55 indicating the product user has committed to purchase/buy.

Purchase/Preference Information 1124: One or more sub-fields set by database interface 55 providing purchasing history about the user including preferred brands and the interests and preferences listed by the user during the Full Registration Process or Purchase Process.

Shipping Information 1126: Comprises one or more sub-fields recording the shipping information selected by the user including the tracking information on the delivery of the purchased product to the user including method of shipment, carrier, date of shipment and estimated time of arrival ("ETA").

Customization Options 1128: Comprises one or more sub-fields recording customization options selected by the user during the Delivery process.

FIG. 11 also provides an implementation of the fields in the project records 76a', b', ... n' of the further preferred embodiments, which include:

Record ID 1210: Provides a unique identifier generated by the database interface 55 for each product.

Product Name 1212: Provides an identifier for the product.

Manufacturer's/Provider's Name 1214: Provides an identifier name of manufacturer/provider of the product.

Price Info 1216: Provides cost per unit information about the product.

Dept Code 1218: Provides the type of product (i.e. electronics, automobiles, etc.) and subcategory of product (televisions, telephones, SUVs, minivans, etc.).

No. of Buys Needed 1220: Provides the preset number of purchases/buys for the transaction to complete.

No. of Buys Received 1222: Provides the number of orders by users to purchase the product.

Purchaser Record 1224: Provides a list of all users purchasing the product.

Cutoff Date 1226: Provides the preset date that the number of purchases/buys needed equals the number of purchases/buys received.

Stock Info 1228: Comprises one or more sub-fields recording the number of products available to be sold.

Those skilled in the art will appreciate that FIG. 11 is a preferred embodiment of the records 71a', b', ... n', and 76a', b', ... n' but not as the only implementation. The database tables 70' and 75' can be structured in many alternative formats to accomplish the present invention.

Typically a product will be available for sale once a contract is made between the manufacturer/service provider and the website owner. The contract will be an option contract for the website owner to buy a certain quantity of products at a specific price by a certain date. The contract will stipulate that the website owner will not have any obligation to exercise the option. Given that the contract will be for a volume purchase, the specific price is expected to be at wholesale/volume discount prices. Based on the contract price achieved by the website owner, the website owner will set a fixed price. Given that the website owner will not need to carry an inventory, and theoretically have an established base of buyers/users that would have registered with the site, costs for the website owner will be minimal. No retail space is required and the potential buyers will already be present. In addition, given the popular following of the product family, minimal advertising expenses by the website owner is expected. In addition, because the community purchasing model is expected to create a buzz around the "great price" for a particular product and the need for others to participate in the purchase, a grassroots marketing campaign is expected to be seen without any cost to the website owner. A simple listing of the item is all that's required. Thus, in preferred embodiments, the fixed price will be at a price that is cheaper than any price that an individual buyer could find, yet the price would still be profitable for the website owner (i.e. price that's higher than the contract price). In alternative embodiments, the fixed price can be at the contract price or even a loss leader to attract people to the site. In alternative embodiments, the fixed price can vary after a certain amount of buys as dictated by the option contract or by the decision of the website owner. Specifically, a manufacturer may be willing to lower the price further if a greater quantity of items are sold or the website owner may be willing to take a smaller margin on a greater number of purchases if the demand exceeds the minimum number of buys.

The minimum umber of purchases/buys will be set based on the contract with the manufacturer/service provider, given that the contract will obligate the manufacturer to provide a certain number of products. The cut off date for when the number of orders is required is also set based on the contract terms and/or market analysis. The database administrator then allows the creation of a separate record 76a', b', ... or n' for each product in the database 60. The data for the Record ID 1210, Product Name 1212, Manufacturer/Service Provider Name 1214, Price Info 1216, Department Code 1218, No. of Buys/Purchases Needed 1222, and Cut off Date 1226 is generated and stored in the appropriate product record 76a', b', ... n'. In preferred embodiments, the option contract will be negotiated between the website owner and manufacturer/service provider directly. However, in alternative embodiments, an additional vendor table (not shown) can be placed in the database 60 such that it tracks approved individual vendors. The database can be modified to allow approved individual vendors (i.e. manufacturers/service providers who have an established relationship with the website owner) to directly list their product for sale by submitting both minimum number of buys and price inputs into the system. Such listings would be consistent with all other product listings on the website.

Figure 12:
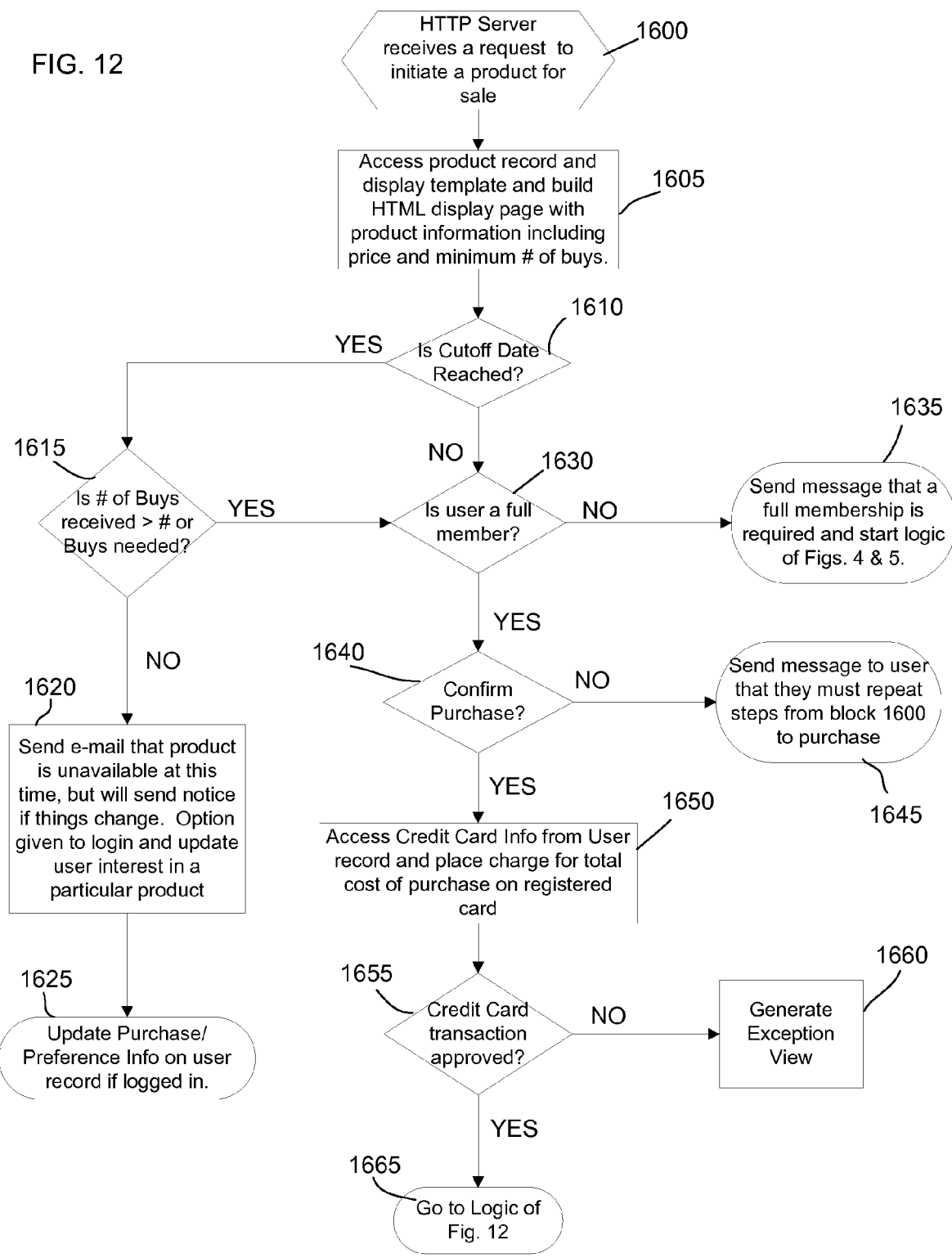
FIG. 12 illustrates a program flow implemented in the server for the payment process according to further preferred embodiments of the present invention.

As described above, the preferred embodiments envision that only a user who has signed up for Full Membership can participate in purchase transaction. In alternative embodiments, the purchase transaction can be made available to any visitor of the website. FIG. 12 illustrates a program flow implemented in the server for the payment process according to the preferred embodiments of the present invention. At block 1600, the HTTP server 50 receives a request to purchase a product listed in the product database table 75'. At block 1605, the database interface 55 accesses the product record 76a', b', ... or n' for the selected product, and builds an HTML web page using the display template 65 with information recorded in the Manufacturer/Service Provider Name 1214, Product Name 1212, and Price Information 1216 fields. At block 1610, the database interface 55 determines whether the cutoff date has been reached by comparing the server's internal date clock with the date listed in the Cutoff Date field 1226. If the cutoff date has been reached, the database interface 55 at block 1615 determines whether the number of buys received is greater than the number of buys needed by comparing the two fields, Number of Buys Needed 1220 and Number of Buys Received 1222. If not enough buys/purchases were received for the product by the cutoff date, then at block 1620, a notice is sent to the user that the product is unavailable at this time, but may be available again at some future date. An option is given to the user to update his record to keep informed of any changes in the future. A user must be logged in to allow the database interface 55 locate the user record 71a', b', ... or n' belonging to the user. Once the user record 71a', b', ... or n' is located by the user logging in, the database interface 55 updates the purchase/preference info field 1124 of the user record 71a', b', ... n' to list the particular product requested.

If the cutoff date has not been reached, the user is given the ability to purchase the product. At block 1630, the user is asked to login and the database interface 55 determines whether the user has already signed up for Full Membership. If the user has not previously signed up for Full Membership, the user is told that full membership is required and directed to sign up for Full Membership according to the logic of FIGS. 4 and 5 (at block 1635). If the user has previously signed up for Full Membership, then the user is given the option to confirm the purchase quantity and identity of the product at block 1640. If the user decides not to purchase, then a message is sent by the database interface 55 that the user must start the logic of FIG. 6 again to purchase the product, and the logic of FIG. 12 is terminated. If the user confirms the purchase, at block 1650, the database interface 55 accesses Credit Card Info field 1120 and places a charge for the total cost of the purchase. Alternatively, the database interface 55 can place a hold on the credit card for the entire amount of the purchase. At block 1655, the database interface 55 waits until the credit card authorization is received. If the transaction is rejected, an exception view is generated at block 1660 asking the user to input another credit card or to check with the user's credit card company. The user is given the opportunity to input new credit card information updating the user record, and retrying the credit card approval process. Once the credit card transaction is approved at block 1665, the logic of FIG. 13 is started.

Figure 13:
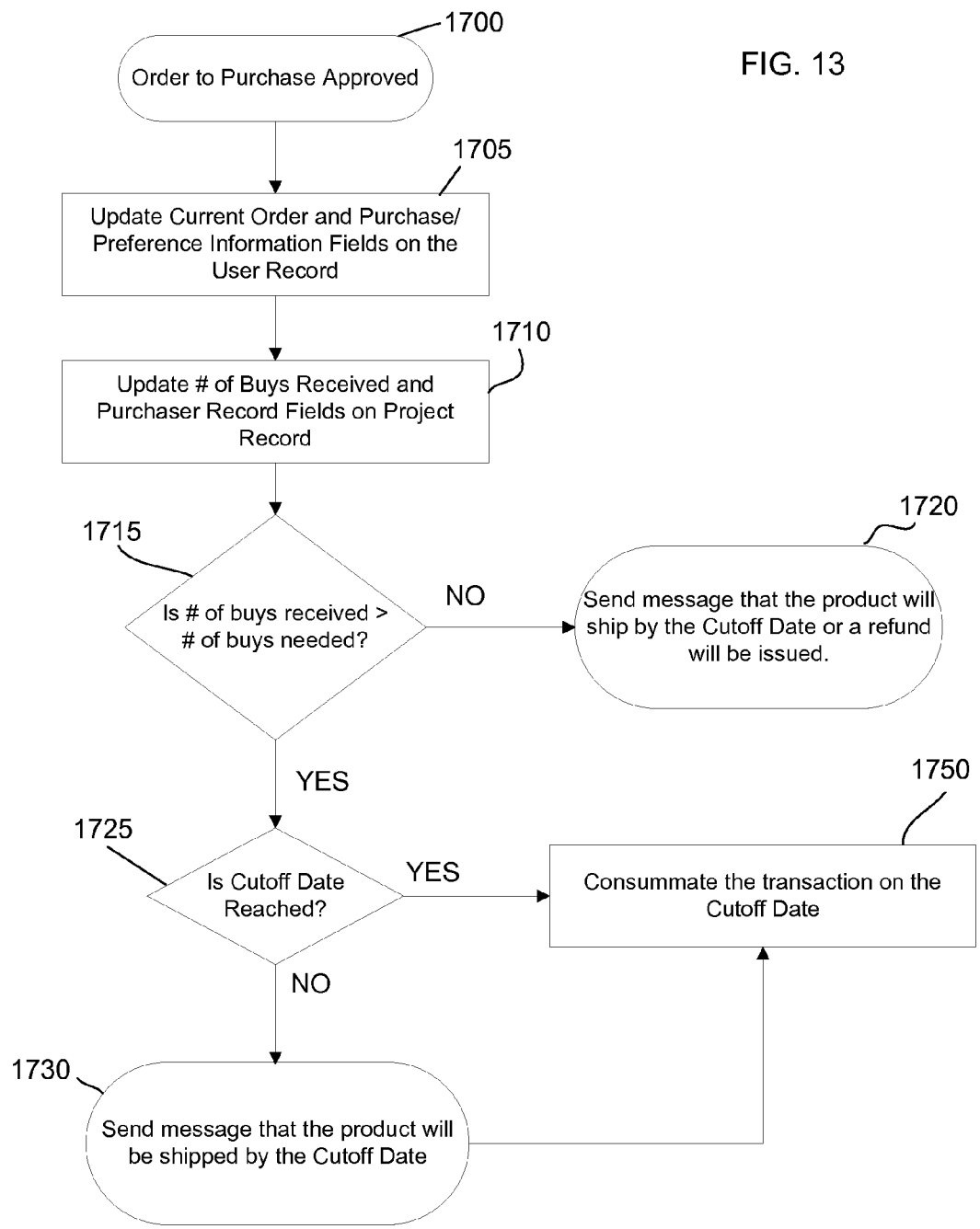
FIG. 13 illustrates a program flow implemented in the server to determine whether to consummate the transaction in accordance with further preferred embodiments of the present invention.

FIG. 13 illustrates a program flow implemented in the server to determine whether sufficient demand to purchase the product at the fixed price exists in accordance with further preferred embodiments of the present invention. Once the order to purchase has been approved at block 1700, the Current Order field 1122 and Purchase/Preference Information 1124 on the user record 71a', b', ... or n' is updated by the database interface 55. Thus, each decision to purchase a product by the user is tracked in the unique user record 71a', b', ... n'. In addition, at block 1710, the Number of Buys Received field 1222 and the Purchaser Record field 1224 on the product record 76a', b', ... or n' is updated by the database interface 55. The value of the Number of Buys Received is increased by the quantity of approved orders placed by the user, and the log of all the users who have placed an order for the product is kept track in the product record 76a', b', ... or n'. At block 1715, the database interface 55 determines whether the number of buys/purchases received is greater than the number of buys/purchases needed by comparing the two fields, Number of Buys Needed 1220 and Number of Buys Received 1222. If the number of buys/purchases received is less than the number of buys/purchases needed, then at block 1720, a notice is sent to the user that the product will begin shipped by the date listed in the Cutoff Date field 1226 or a refund will be automatically issued to the user credit card, and the logic of FIG. 13 is terminated. If the number of buys/purchases received exceeds the number of buys/purchases needed, the database interface 55 at block 1725 determines whether the cutoff date has been reached by comparing the server's internal date clock with the date listed in the Cutoff Date field 1226. If the cutoff date has been reached, then the database interface at block 1750 will consummate the transaction (i.e. exercise the option on the contract with the manufacturer/service provider). In preferred embodiments, the database interface will arrange for the shipment of the product to the buyer directly from the manufacturer/service provider and send payment to the manufacturer/service provider by electronic bill pay, ACH, wire, or other payment options. In alternative embodiments, the products will be shipped to the website owner, and the website owner will arrange for the shipment of the product directly to the buyers/purchasers and pay for the products as stipulated in the contract (e.g. FOB, credit, etc.). Shipment from the website owner can be performed similarly as described in FIG. 9. On the other hand, if the cutoff date has not been reached, a message to the user/buyer is sent (at block 1730) that the product will be shipped by the Cutoff date. The logic of FIG. 13 eventually terminates at block 1750 once the Cutoff date is reached since the number of buys/purchases received has exceeded the number of buys/purchases needed.

Although in preferred embodiments, all of the buys are envisioned to come from users of the website, alternative embodiments may provide for ways to have the website owner to actually make additional purchases of the product to increase the number of buys received. Thus, the website owner may be a participant in the purchase of the product as well. In certain embodiments, the website owner can even manipulate the number of buys required as displayed to the users before the cutoff date even though the minimum number of buys required is still fixed by the contract. Thus, the website owner may participate in one or more ways to ensure that certain product transactions are consummated.

Figure 14:
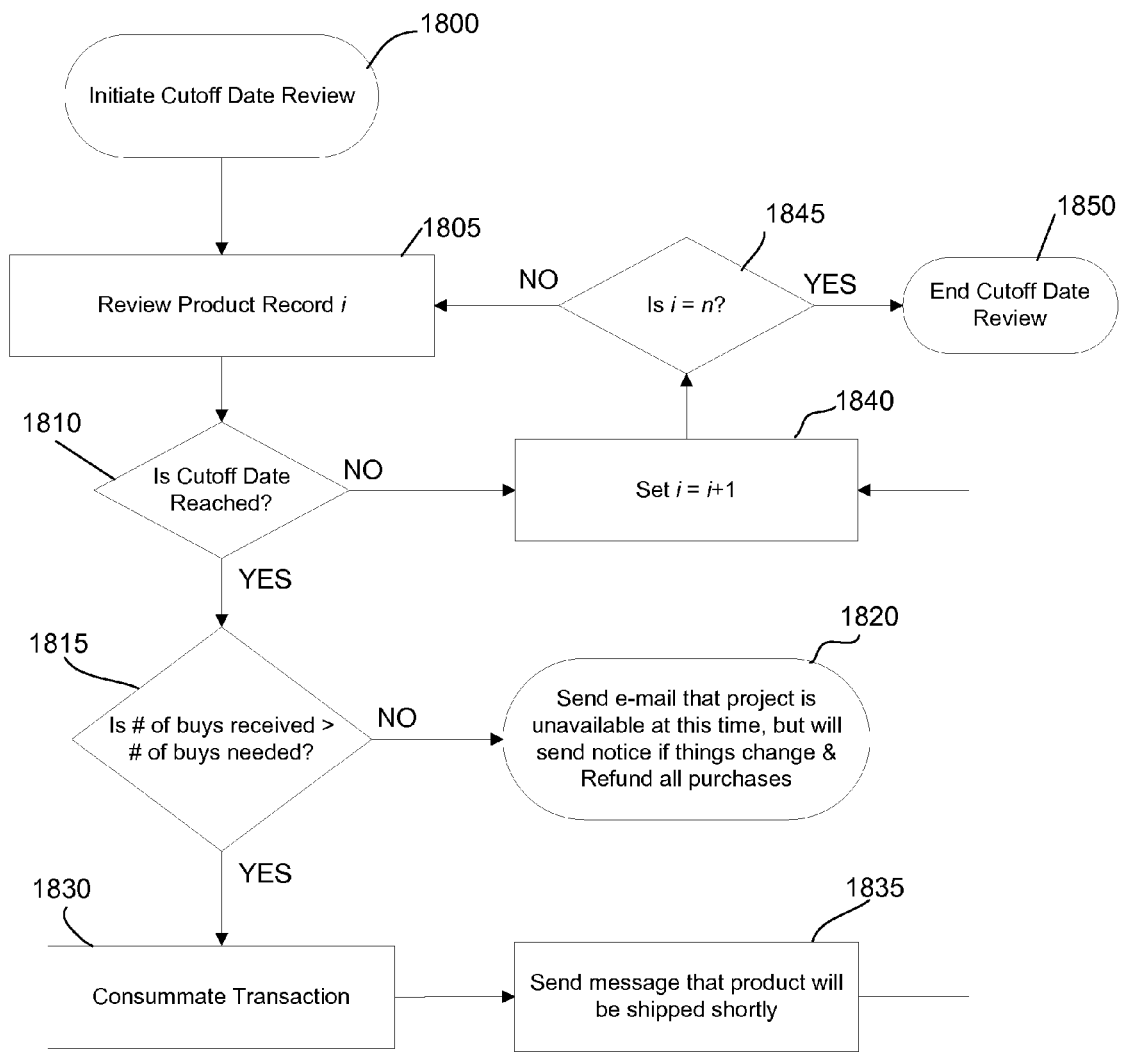
FIG. 14 illustrates an alternative program flow implemented in the server to determine whether to consummate the transaction in accordance with further preferred embodiments of the present invention.

FIG. 14 illustrates an alternative program flow implemented in the server to determine whether to produce the work of art project in accordance with preferred embodiments of the present invention. At block 1800, the database interface is scheduled to initiate a cutoff date review of the product records 76a', b', . . . n' on a daily basis. In alternative embodiments, the review can occur at any other periodic period including multiple times daily to every few days or weekly, monthly, etc. The cutoff review begins by the database interface 55 checking the Cutoff Date field 1226 on each individual product record 76a', b', . . . n' (at block 1805). Whether the cutoff date has been reached is determined by comparing the server's internal date clock with the date listed in the Cutoff Date field 1226 (at block 1810). If not, then database interface is set at block 1840 to check the next project record. Before the next product record 76a', b', . . . n' is reviewed, the database interface checks to see if all the project records have been checked already (at block 1845). If all of the product records 76a', b', . . . n' have been checked, the logic of FIG. 14 is terminated at block 1850. Otherwise, the next product record 76a', b', . . . n' is reviewed for its cutoff date. If the cutoff date has been reached for a particular product record 76a', b', . . . n', then the database interface 55 at block 1815 determines whether the number of buys/purchases received is greater than the number of buys/purchases needed by comparing the two fields, Number of Buys Needed 1220 and Number of Buys Received 1222. If not enough buys/purchases were received for the product by the cutoff date, then at block 1820, a notice is sent to the user that the product is unavailable at this time, but may be available again at some future date. All orders for purchase are then refunded by crediting back the credit card for all users who have purchased the product as logged in the Purchaser Record field 1224 of the product record 76a', b', . . . n'. On the other hand, if the number of buys/purchases received exceeds the number of buys/purchases needed, then the database interface at block 1750 will consummate the transaction (i.e. exercise the option on the contract with the manufacturer/service provider), and send a message to the user/buyer is sent (at block 1835) that the product will be shipped by the Cutoff date. The logic of FIG. 14 terminates at block 1850 once all of the project records 76a', b', and n' are checked that day.

Those skilled in the art will appreciate that alternative embodiments exists from the description of the preferred embodiments without departing from the spirit and scope of the invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were shown in the context of network system, where all of the communications were performed through the Internet. However, in alternative embodiments, many of the functions can be performed by other means of communication such as telephone, fax, e-mail, etc. For example, the website owner may directly call the user to notify change in order status, confirming information, etc.

Preferred embodiments were described with respect to the database interface 55 performing the comparisons of the number of bids/buys, cutoff date, etc. However, in alternative embodiments, some of the functions of the database interface may be implemented in a separate script program or eliminated altogether. Alternatively, the functions shown may be combined or split in any manner amongst one or more systems. Additionally, preferred embodiments were described with respect to the algorithm where the number of bids/buys received exceeded the number of bids/buys needed, however, alternatively, the algorithm can easily be set to when the number of bids/buys received equals or is equals to or greater than the number of bids/buys needed.

In addition, preferred embodiments described the user and project/product information as implemented as database records in a database table. However, the user and project information may be implemented in any format for maintaining object information, including spreadsheet, non-database table, etc. Thus, as used herein, the terms database record, database table, and database refer to any data structure known in the art for maintaining information on data objects, such as relational databases, non-relational databases, spreadsheets, ASCII text files, etc.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented collective purchasing method stored on a server and accessible over a network or Internet, comprising:

generating a product database implemented on the server including at least one product record, wherein each product record is associated with a product;

pooling a number of buys in a group buying setting on the server over a period of time at a preset fixed price from users for the product associated with the at least one product record, wherein each buy is a commitment to complete a purchase transaction and wherein the number of buys provides a collective demand for the product, and wherein the preset fixed price is locked while pooling the number of buys and remains unchanged regardless of the number of buys such that a seller of the product will have an exact expected revenue in the group buying setting; updating the at least one product record in the product database located on the server to record the number of buys for the product associated with the specific product record; and consummating the purchase transaction on the server if the number of buys for the product associated with the at least one product record reaches a preset number of buys; wherein the user will know the fixed price when the buy is entered.

2. The computer implemented collective purchasing method of claim 1, further comprising
setting a cutoff date by when the number of buys must reach the preset number of buys.

3. The computer implemented collective purchasing method of claim 2, further comprising:
determining whether the cutoff date has been reached for the at least one product record; and
collecting a number of buys from users for the product associated with the at least one product record until the cutoff date has been reached.

4. The computer implemented collective purchasing method of claim 1, further comprising:
obtaining a pre-payment for the product with each buy.

5. The computer implemented collective purchasing method of claim 4, further comprising:
setting a cutoff date by when the number of buys must reach the preset number of buys;
determining whether the cutoff date has been reached for the at least one product record;
cancelling the transaction associated with the at least one product record if the cutoff date has been reached and the number of buys associated with the product record does not reach the preset number of buys, and
returning the pre-payment.

6. The computer implemented collective purchasing method of claim 1, wherein the fixed price is set by a vendor of the product.

7. The computer implemented collective purchasing method of claim 1, wherein the step of consummating the purchase transaction allows the product to be shipped directly from the manufacturer.

8. The computer implemented collective purchasing method of claim 1, further comprising:
wherein the buyer knows that the fixed price is based on having a fixed number of buys from other users in order for the purchase transaction to occur and is motivated to find additional buyers if the buyer wants the purchase transaction to be consummated.

9. The computer implemented collective purchasing method of claim 1, further comprising:
transmitting over the network or Internet an input page in which the user enters information about interest and preferences of user;
receiving the input page with the information entered by the user; and
recording the information in the at least one user record associated with the user.

10. The computer implemented collective purchasing method of claim 1, wherein the collective demand leads to the product being developed.

11. A computer implemented collective purchasing method stored on a server and accessible over a network or Internet, comprising:
generating a product database implemented on the server including at least one product record, wherein each product record is associated with a product;
setting a fixed quantity of the product offered for sale; pooling a number of buys in a group buying setting on the server from users for the product associated with the at least one product record, wherein each buy is a commitment to complete a purchase transaction and wherein the number of buys provides a collective demand for the product and wherein the fixed quantity is locked while pooling the number of buys and remains unchanged regardless of the number of buys such that a seller of the product will know an exact inventory requirement in the group buying setting; updating the at least one product record to record the number of buys for the product associated with the specific product record; and consummating the purchase transaction on the server if the number of buys for the product associated with the at least one product record reaches the fixed quantity of the product offered for sale; wherein the user will know the fixed quantity when the buy is entered.

12. The computer implemented collective purchasing method of claim 11, further comprising
setting a cutoff date by when the number of buys must reach the fixed quantity of the product offered for sale.

13. The computer implemented collective purchasing method of claim 12, further comprising:
determining whether the cutoff date has been reached for the at least one product record; and
collecting a number of buys from users for the product associated with the at least one product record until the cutoff date has been reached.

14. The computer implemented collective purchasing method of claim 12, further comprising:
wherein the buyer knows that the number of buys much reach the fixed quantity for the purchase transaction to occur and is motivated to find additional buyers if the buyer wants the purchase transaction to be consummated.

15. The computer implemented collective purchasing method of claim 11, further comprising:
obtaining a pre-payment for the product with each buy.

16. The computer implemented collective purchasing method of claim 15, further comprising:
setting a cutoff date by when the number of buys must reach the fixed quantity of the product offered for sale;
determining whether the cutoff date has been reached for the at least one product record;
cancelling the transaction associated with the at least one product record if the cutoff date has been reached and the number of buys associated with the product record does not reach the fixed quantity of the product offered for sale, and returning the pre-payment.

17. The computer implemented collective purchasing method of claim 11, wherein the fixed quantity is set by a vendor of the product.

18. The computer implemented collective purchasing method of claim 11, wherein the step of consummating the purchase transaction allows the product to be shipped directly from the manufacturer.

19. The computer implemented collective purchasing method of claim 11, further comprising:
transmitting over the network an input page in which the user enters information about interest and preferences of user;
receiving the input page with the information entered by the user; and
recording the information in the at least one user record associated with the user.

20. The computer implemented collective purchasing method of claim 11, wherein the collective demand leads to the product being developed.

* * * * *